United States Patent [19]

Wilharm

[11] 4,210,480
[45] Jul. 1, 1980

[54] STEAM SEAL OF BAG PLY

[75] Inventor: Fred B. Wilharm, Cantonment, Fla.

[73] Assignee: St. Regis Paper Company, New York, N.Y.

[21] Appl. No.: 934,545

[22] Filed: Aug. 17, 1978

[51] Int. Cl.² .............................................. B32B 3/00
[52] U.S. Cl. .................................. 156/308.4; 53/373;
53/477; 156/322; 156/359; 156/364; 156/497
[58] Field of Search ........ 156/351, 358, 359, 362–364,
156/368, 583, 497, 306, 322, 357; 53/469, 477,
479, 500, 69, 71, 375, 373, 378, 407; 100/45, 49;
271/265, 266

[56] References Cited

U.S. PATENT DOCUMENTS

| 2,423,237 | 7/1947 | Haslacher | 156/497 X |
| 2,978,008 | 4/1961 | Conti | 53/373 X |
| 3,248,843 | 5/1966 | Winters et al. | 53/373 X |
| 3,610,114 | 10/1971 | Kaminsky | 53/375 X |
| 3,793,115 | 2/1974 | Jindra | 156/381 |
| 3,830,681 | 8/1974 | Wilson | 53/373 X |
| 3,953,272 | 4/1976 | Webber | 53/39 X |
| 3,977,306 | 8/1976 | Flynn | 53/375 X |
| 3,991,543 | 11/1976 | Shaw | 53/373 |
| 4,042,440 | 8/1977 | Hasegawa et al. | 156/357 X |
| 4,082,595 | 4/1978 | Slater | 156/364 X |

Primary Examiner—David A. Simmons
Attorney, Agent, or Firm—Pearne, Gordon, Sessions, McCoy & Granger

[57] ABSTRACT

A steam seal machine and process is disclosed to seal together the two contiguous edges of an inner heat sealable ply in a multi-ply tubular bag form. The bag forms are conveyed transversely to their length by a first continuous conveyor and then by an intermittently operating conveyor into an openable steam chest. The second conveyor stops, and the steam chest closes so that it envelops the open mouth of the bag form. Steam is admitted to the steam chest through a valve and this steam penetrates the open end of the multi-ply bag form to seal together the contiguous edges of the heat sealable ply. In this way the steam need not penetrate through several layers of kraft paper or other reinforcing plies. The steam valve is closed, the steam chest opens and the second conveyor restarts to convey the bag form beyond the steam chest so that a part of a successive bag form may enter the steam chest. This part may be the top, bottom or side of the bag form whereat the heat sealable ply is being sealed. The foregoing abstract is merely a resume of one general application, is not a complete discussion of all principles of operation or applications, and is not to be construed as a limitation on the scope of the claimed subject matter.

25 Claims, 3 Drawing Figures

STEAM SEAL OF BAG PLY

BACKGROUND OF THE INVENTION

Some prior art heat sealing machines for bags, for example, used heated conductor bars which pressed against or were very closely adjacent the bag material, for example, kraft paper outer ply with a heat sealable inner ply such as polyethylene film. A typical construction was a machine about 60 feet long with many separate heaters in rod form placed along the path of movement of the bag forms. Such machines were inefficient in transfer of heat through the kraft paper to the PE film and also had a large heat storage capacity so that they could not respond quickly to require the changes in heat. Many such electrical bar heaters were of the sheathed type wherein an electrical resistance wire is separated from a tubular metal sheath by electrical insulation. This electrical insulation is also generally a heat insulation so that the transfer of heat from the inner electrical resistance wire to the outer tubular metal sheath was not a rapid process. Next the heat had to be transferred by radiation or conduction through the sheath to the kraft paper and then by conduction through the paper to the PE film. If there was a good surface contact between the rod heaters and the moving bags, then there was a frictional drag at this point which often marked the bags to make them unsightly. If there was a very small space between the bag and the heater, then the transfer of heat was greatly impeded. One result was that the entire sealing machine then became quite hot and personnel had to be shielded from this excess heat. Another defect was the slowness of operation of the machines and a further defect was the difficulty of locating burned out heater elements in the long machine. Where the sealing machine was used in the construction of bags to seal one end of the bag, a rate of 60 bags per minute was a usual production rate.

Such machines, however, were in operation for sealing the inner ply of a two ply bag where the outer ply was of kraft paper, because enough heat could be imparted through the kraft paper to heat seal the inner PE ply. However, present day usage of heat sealed bags has increased and ever tougher bags are desired, especially those which will handle chemicals, foodstuffs and other fine powdery material without leakage and also be vermin free, yet be tough enough for domestic shipment and shipment to foreign countries and withstand the rough handling in route. Such bags have been constructed and sometimes have as many as three kraft paper plies plus a tough plastic reinforcing ply plus a heat sealable inner ply. These may be termed barrier bags, reinforced bags or pouch bags.

Other recently developed bags which are quite difficult to seal are those which are lacquer coated on the exterior surface, because such lacquer becomes discolored or disfigured by the heater bars of the sealing machine. Other bags which are difficult to seal are those which are gravure printed on a clay coated bleached kraft outer ply. Such current methods of heat sealing damage the appearance of such special bags. Still other bags difficult to seal with bar type heaters are those which use a reinforcing ply which is formed of two cross laminated oriented plastic films sold under the trademark Valeron. This has a cross grained structure similar to plywood for strength, yet the strength of the heat sealable Valeron film is greatly weakened by bar type heaters where the heat is conducted through the kraft paper plies and Valeron ply to the inner heat sealable ply.

SUMMARY OF THE INVENTION

The problem to be solved is how to construct a sealing mechanism and method which will seal those bags previously very difficult to seal including those with a lacquer coated outer surface, a gravure printed outer surface, or a clay coated bleached kraft outer surface. Also how to seal bags which contain an intermediate ply of cross laminated oriented plastic heat sealable film without damaging such film. This problem is solved by a bag ply sealer to seal together two contiguous edges of inner heat sealable ply means in a bag form, comprising, in combination, an openable and closable steam chest positioned on a first path, valve means connected to supply steam to said chest, conveyor means to move a bag form along said first path to said steam chest, power means connected to open and to close said steam chest in a condition enveloping an open part of the bag form with two contiguous edges of the heat sealable ply means exposed to the interior of said steam chest, and control means connected to said power and valve means, to close said steam chest over the open part of a bag form and to stop conveying of the bag form, to control said valve means to apply steam to said steam chest to enter the open part of a bag to heat the two contiguous edges of the heat sealable ply means, to close said valve means, and to open said steam chest and restart the conveying of the bag form by said conveyor means to move the bag form out of the opened steam chest.

This problem is also solved by the process of sealing together two contiguous edges of inner heat sealable ply means in a bag form by use of conveyor means and a two part openable steam chest, comprising the steps of: conveying a bag form on the conveyor means toward the steam chest, closing said steam chest upon an intermediate part of a bag form to hold the bag form stationary and to envelop the open part of the bag form, applying steam to said steam chest to cause it to enter the open part of the bag form to heat seal the exposed contiguous edges of the inner heat sealable ply means, terminating the supply of steam to the steam chest, and conveying the bag form beyond the steam chest.

An object of the invention is to provide a bag sealing mechanism which will seal single or multiple ply bags with a heat sealable inner ply.

Another object of the invention is to provide a heat sealing mechanism and process which does not damage an easily damaged outer surface on a bag nor damage an inner reinforcing ply of heat sealable material.

Another object of the invention is to utilize steam in a steam chest to enter an open mouth of a bag to seal a heat sealable inner ply.

Other objects and a fuller understanding of the invention may be had by referring to the following description and claims, taken in conjunction with the accompanying drawing.

DESCRIPTION OF THE PREFERRED EMBODIMENT

Figure 1:
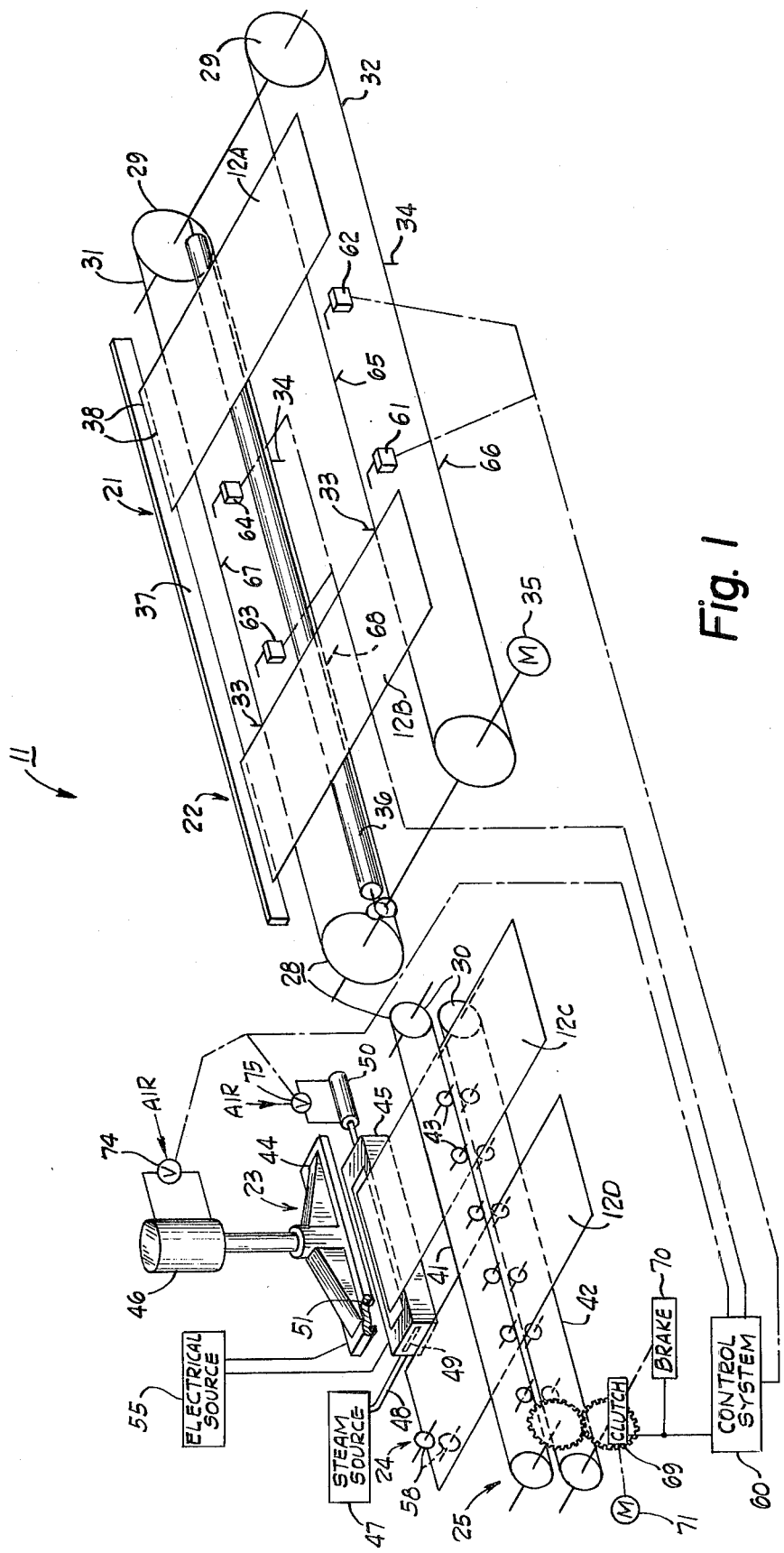
FIG. 1 is a generally rear isometric view of a machine illustrating the invention.
Figure 2:
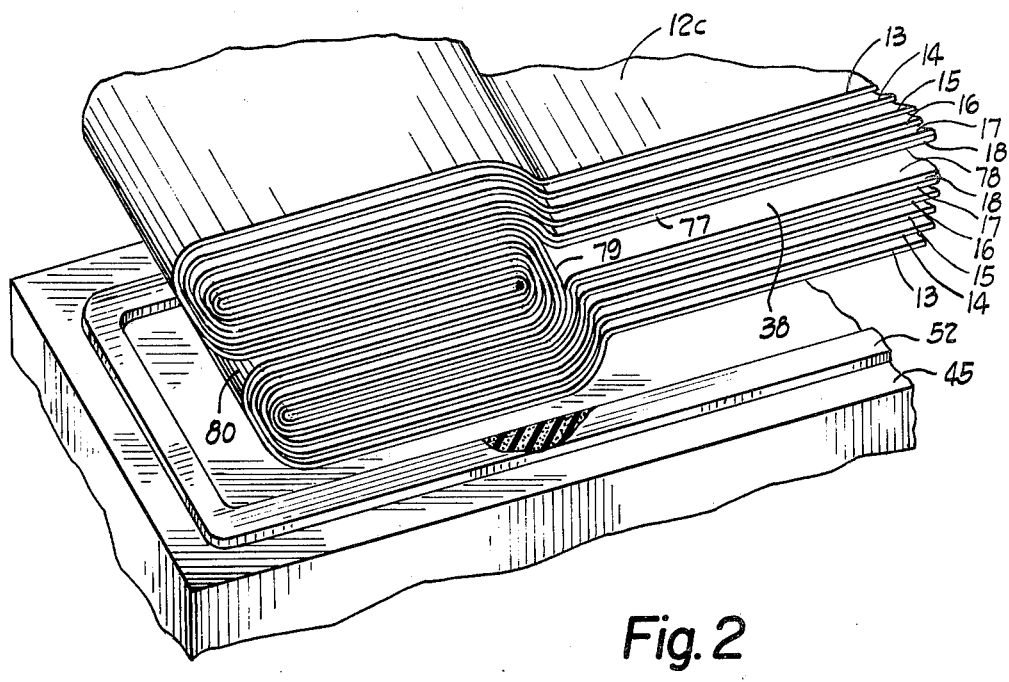
FIG. 2 is an enlarged isometric view of a bag being sealed in a steam chest.

The bag ply sealer machine 11 is shown rather schematically in FIG. 1. This machine is for use to seal a heat sealable ply in a bag form. In general the machine 11 may be used to seal together two contiguous edges of an inner heat sealable ply or plies. These two contiguous edges may be along one side or both sides of a bag form 12, but as shown in FIG. 1 they are at an open mouth at one end of the bag form. These bag forms, when they are closed along both sides are called bag tubes in the industry, although the present invention is not limited for use with such tubular shape bag forms which are open at both ends. The bag forms 12 are ones which have a plurality of plies as an example of bags which are difficult to seal. The plurality of plies include an inner heat sealable ply or plies and this may be either a separate heat sealable film or a heat sealable coating on the innermost ply such as a kraft paper ply. In fact, the bags with which the machine 11 is used are frequently constructed of plural kraft paper plies, as shown in FIG. 2. A typical bag form is one which has three external plies of kraft paper, plies 13, 14 and 15 plus a ply 16 of a heat sealable cross laminated oriented plastic film such as made of polyethylene, another kraft paper ply 17, and an inner heat sealable ply 18 such as one made of polyethylene. In FIG. 2 these various plies are shown at the open mouth of the bag as being stepped. They may not be so constructed, they may be all cut off flush, however, the stepped construction saves paper when the bag end is folded over and glued to be adhered to the outer surface of the bag to form a closed end bag form.

Figure 3:
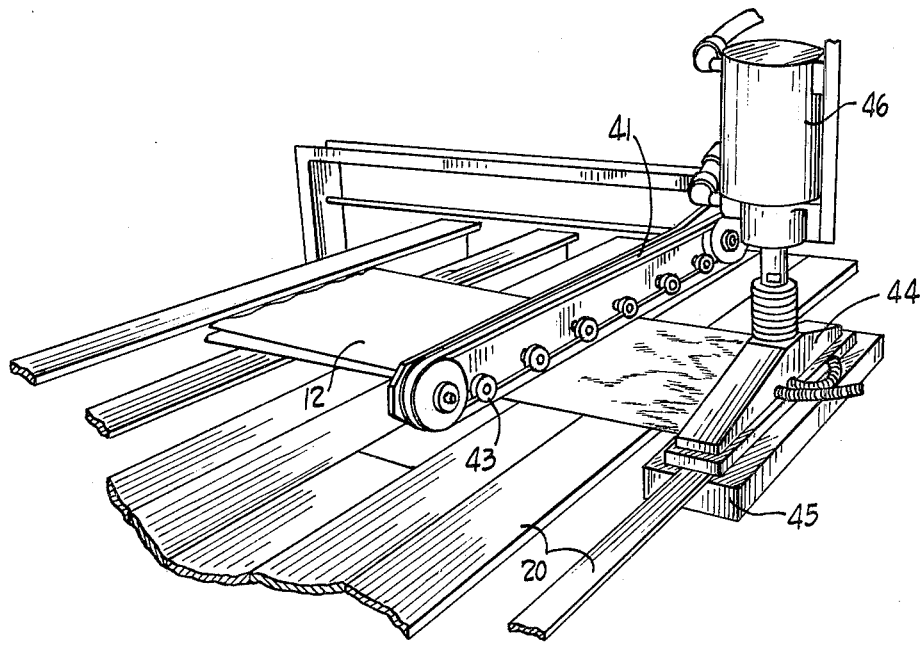
FIG. 3 is a generally front perspective view of the machine of FIG. 1.

The machine 11 includes a horizontal table 20, not illustrated in the schematic FIG. 1 but illustrated in FIG. 3.

The machine 11 includes generally a feed section 21, an optional registration section 22, a sealing section 23, a pressure section 24 and a discharge section 25. The registration section 22 is optional because the bag forms 12 may be fed from some prior machine such as a bag tube making machine, in which case the bag forms can be fed in proper position. If the bag forms 12 are supplied manually, as illustrated, or supplied from some other machine or magazine wherein the bag forms are not in proper registration, then this registration section 22 is desirable. Conveyor means 28 is provided in the machine to convey the bag forms 12. This conveyor means includes a first conveyor 29 and a second conveyor 30. The first conveyor 29 in the preferred embodiment is shown as including first and second chain conveyors 31 and 32, with the upper runs thereof at approximately the level of the table 20, shown in FIG. 3. These chain conveyors 31 and 32 carry bag lugs 33 and 34 to engage and move a bag form 12 generally to the left as viewed in FIG. 1. A motor 35 may be connected to drive these conveyors 31 and 32 for continuous motion while the machine 11 is in operation and also to drive a roller 36 which is disposed parallel to the conveyors and is rotated to move the bag forms 12 over to an aligning fence 37. This is a part of the optional registration section 22 to make sure that the open mouth or open part 38 of each bag form is properly aligned in the machine 11.

Subsequent to the registration section 22, the chain lugs 33 and 34 convey the bags from the first conveyor 29 into the second conveyor 30. This second conveyor is a pair of belt conveyors 41, 42, one above and one below the plane of the table 20. These conveyors may have pressure maintaining rollers 43 to make sure that the bag form 12 is positively gripped and conveyed throughout the length of the belt conveyors 41 and 42.

The second conveyor 30 conveys the bag form 12 into the sealing section 23 and is intermittently operated. The sealing section 23 contains an openable two part steam chest 44, 45. The upper part 44 of this steam chest is movable in a vertical direction by a fluid motor 46 and the lower part 45 is stationary. A steam source 47 is connected to supply steam through a conduit 48 and through a slide steam valve 49 into the lower part 45 of the steam chest. The slide steam valve 49 is actuated by an air cylinder 50.

The fence 37 establishes the alignment of the bag forms so that the open mouths 38 thereof travel in a first path to be within the confines of the lower steam chest 45. The closing of the steam chest by actuation of the fluid motor 46 moves the upper part of the steam chest 44 downwardly so that the open mouth or open part of the bag form is held stationary in and enveloped by the steam chest 44, 45. To establish an effective steam tight seal, a gasket 51 is provided in the upper steam chest 44 and a gasket 52 is provided in the lower steam chest 45. These gaskets may be made of heat resistant material such as synthetic rubber.

An electrical source 55 supplies temperature controlled electrical energy to the steam chest 44, 45 to provide supplemental electrical heating to these parts.

The pressure section 24 in the preferred embodiment includes rollers 58. A pair of such rollers are provided one above and one below the bag form 12. The rollers may be ones with relatively sharp edges or ones with flat cylindrical faces. If the sharp edge rollers are used, these may be used to cut the inner film ply so that a separable inner heat sealable ply bag is loose but enclosed within the kraft paper outer plies to form a pouch bag. If the rollers 58 are narrow cylindrical faced rollers, then they may be used to apply pressure to the seal area of the bag to enhance the seal quality. Rollers of either design may be chosen in accordance with the bag design involved. The second conveyor 30 next conveys the bag forms to the discharge section 25 whereat the sealed bag form is discharged. It may next go to a bag end closer, not shown, whereat the end of the tubular bag form is folded and adhered to itself with adhesive. This will then make a bag form which is closed at one end and left open at the other end for filling with the desired product.

A control system 60 is provided which interconnects all of the various mechanisms. As stated above, the second conveyor 30 is intermittently operated. The starting and stopping of this conveyor is controlled by timing means shown as longitudinally adjustable switch means in the preferred embodiment. A longitudinally adjustably positionable switch 61 is actuated by chain lugs 65 and 66 and connected to the control system 60 to control a clutch 69 and brake 70. These are connected in the drive train from a motor 71 to the second conveyor 30. Actuation of the switch 61 by the chain lug 65 will disengage the clutch 69 and actuate the brake 70. This stops the second conveyor 30. The chain lug 66 will next actuate an adjustable switch 62 to deactuate the brake 70 and reengage the clutch 69 to restart the conveyor 30.

An adjustable switch 63 is actuated by chain lugs 67 and 68 and when actuated by lug 67 controls a valve 74 which is connected to the fluid motor 46 to make it move downwardly and close the steam chest 44, 45. Closing of switch 63 also acts through the control system 60 to control a valve 75 acting to control the air cylinder 50 which moves the steam valve 49. This steam valve may be a long plate with a series of apertures which are out of register with apertures in the steam chest in order to close the valve, yet register with those apertures in the steam chest when the valve is actuated to the open position. This allows the steam to flow into the steam chest through a large number of apertures in parallel. An adjustable switch 64 is also positioned to be actuated by the chain lugs 67 and 68. Actuation of this switch 64 acts through the control system 60 to move the valves 74 and 75 to the opposite condition which will close the steam valve 49 and raise the upper part 44 of the steam chest.

OPERATION

In the operation of the machine the motors 35 and 71 may be continuously operating. This drives the first conveyor 29 consisting of the chain conveyors 31 and 32 for a continuous motion. The bag lugs 33 will continuously convey a bag form 12 from right to left as viewed in FIG. 1 or from left to right as viewed in FIG. 3. The continuously rotating roller 36 will move the open mouth 38 of the bag form over to the alignment fence 37 so that it lies in a first path parallel thereto.

FIG. 1 shows a bag form 12B being conveyed by means of the chain lugs 33. A bag form 12B is resting on the table 20, shown in FIG. 3, but is not yet being conveyed because it has not yet been abutted by the chain lugs 34. Therefore this establishes a certain spacing between the successively conveyed and downstream moving bag forms.

The first conveyor 29 moves bags into the second conveyor 30 whereat they are firmly conveyed by being squeezed between the upper and lower belt conveyors 41 and 42. This second conveyor 30 is intermittently controlled by timing means which is shown in this preferred embodiment as being the position of the switches 61-64 longitudinally on the table 20. The lug 65 will actuate the switch 61 and this disengages the clutch 69 and engages the brake 70 to stop the second conveyor 30. The proper position of switch 61 relative to lug 65 will assure that the bag form 12C is stopped with the open mouth 38 of this bag form at the steam chest 44, 45. Almost simultaneously, although it may be slightly behind or ahead in timing, the lug 67 actuates the switch 63. This acts through the control system 60 to actuate the valves 74 and 75. Again the timing may be adjusted to actuate the valve 74 slightly ahead of valve 75 so that the fluid motor 46 closes the steam chest upper part 44 upon the lower part 45 just prior to opening of the slide steam valve 49. This prevents premature escape of steam. In the preferred embodiment the steam source 47 supplies steam which is somewhat superheated, for example, when at 30 psi the steam would be 274° F., but it is superheated to 400° F. to assure dryness of steam supply. Also in the preferred embodiment the electrical source 55 supplies thermostatically controlled heat to the steam chest 44 and 45 to supplement the heat from the steam. The purpose of this supplemental heat is to make sure that the steam chest parts are at a temperature sufficient so that the steam does not prematurely condense on the walls of the steam chest. The water will slightly interfere with the sealing of the heat sealable ply, and it is also undesirable to wet the kraft paper of the bag form.

The steam entering the steam chest 44, 45 under pressure and elevated temperature readily enters the open mouth of the bag form 12C because this open mouth is enveloped by the closed steam chest. As best shown in FIG. 2, the lower gasket 52 has a portion engaging the lower surface of the side of the bag from 12C, and the upper gasket 51, shown in FIG. 1, will have a part engaging the upper side surface of this bag form 12C. The remaining three sides of the gaskets 51 and 52 will seal on each other directly. The steam will fill the chamber of the steam chest and penetrate the bag mouth reaching the hidden inner film ply 18, heating it, causing it to melt and fuse. Two edges 77 and 78 of the inner heat sealable ply 18 are contiguous in each bag form 12. This is true even though the bag may have a gusset 80 as shown in FIG. 2. The representation of the bag form in FIG. 2 is exaggerated in thickness of the kraft paper plies, in view of the necessity to show a double line for each ply. These contiguous edges 77 and 78 are heated by the steam so that they melt enough to fuse together and therefore seal the end of the bag.

A difficult place to fuse is at the junction 79 of the inner V end of the gusset 80 and the intermediate portion of the inner heat sealable plies 18. In practice, it has been found that a seal of the contiguous edges 77 and 78 is formed entirely to the boundary established by the inner edge of the gaskets 51 and 52. In one machine constructed in accordance with the invention this gasket was about one quarter inch wide, and since the gaskets get hot in repeated use of the machine, the contiguous edges 77 and 78 develop a white colored area in the ply 18 of about one fourth inch wide which is a type of a false seal, established at the area immediately between the two gaskets 51 and 52. The heat is not as intense at this point, but the pressure from the fluid motor 46 is quite high and this establishes this false seal. By this is meant that a partially sealed area is established so that when the bag is later filled with material, the pressure of this material tending to force open the seal between the contiguous edges 77 and 78 must first rupture or pull apart the two inner plies 18 at this false seal area. This has been found to distribute the force over a larger area to inhibit the rupturing of the seal established between these two heat sealable plies 18.

The next successive bag 12B will be just about ready to approach the steam chest 44, 45 at the time that the lugs 66 and 68 actuate the switches 62 and 64. Again this timing may be adjusted as desired, for example, it may be desired to have switch 64 actuated just prior to actuation of switch 62. Actuation of this switch 64 acts through the control system 60 to actuate the valves 74 and 75. This closes the steam valve 49 and opens the steam chest 44 and 45. Actuation of switch 62 acts through the control system 60 to disengage the brake 70 and reengage the clutch 69 so that the conveyor 30 moves the bag form 12C out of the sealing section 23. At about this time the next bag 12B is engaged by the second conveyor 30 to be conveyed into the sealing section 23. The bag form 12C will then be moved on through the pressure section 24 in the position shown by bag form 12D in FIG. 1. In this position the rollers 58 act on the bag form to perform either a bag pouch cutting function or to apply pressure to enhance the seal quality, as required by the bag design involved. During this period of movement of the conveyor 30 or during subsequent movement of the conveyor 30, the bag form 12D is conveyed to the discharge section 25 to be stacked or to be used in some further machine function, for example, a bag end closer.

It will be noted that the machine 11 provides a process of sealing together two contiguous edges of inner heat sealable ply means, whether the ply means is a separate film ply or whether it is a heat sealable coating on the innermost ply 17 such as a kraft paper ply. Also in FIG. 2 there is shown a ply 16 which may be a cross laminated oriented plastic film of heat sealable material. This may be a polyethylene material which is oriented and yet two parts thereof are laminated at right angles to each other, similar to that encountered in plywood, in order to create a high strength plastic film. Since this plastic film is also of polyethylene, and is affected by heat, bags of this construction have been ones in which it is extremely difficult to seal the inner ply 18 without damaging or clarifying this plastic film 16. In the prior art type of sealers where electrically heated conductor bars are engaging or in close proximity to the outer surface of the bags, the heat must be conducted through the several layers of the bag forms. Thus the heat must first pass through this cross laminated plastic film 16 before it reaches the ply 18 which is desired to be sealed to itself. One can therefore appreciate the difficulties of attempting to seal the ply 18 without damaging the ply 16. As a matter of fact it has been found through experience that such conductor bar type sealers did damage the film 16. Accordingly, the present invention is one which has superior advantages in this type of a bag form 12 which is multi-ply, and which has as one of the intermediate plies this cross laminated oriented plastic film of heat sealable material.

Bags are being used for many different purposes and one bag successfully sealed on the present machine is one which had a polyethylene coated exterior surface or lacquer coated exterior surface and one which had been gravure printed on a clay coated bleached kraft outer ply. In attempting to seal the inner heat sealable ply of such bag, it was found that use of the prior art conductor bar heat sealer damaged the lacquer coating and marked it, which was undesirable from an appearance standpoint. The heat sealing machine of the present invention successfully sealed such bags without marking the exterior surface or damaging the lacquer coating or gravure printing.

The use of steam in the steam chest 44 and 45 has been found to have a definite advantage over the prior art system of using hot air. If hot air at 500° F. were used for example, this would not only damage the surface printing or lacquer coating, but also damage the cross laminated oriented plastic film 16. Still further the use of such hot air would make the machine considerably slower than at present. The reason for this is the heat of condensation. If heated air at 400° F. is used, for example, then the amount of BTUs imparted to the contiguous edges 77 and 78 will be only about 10 BTU in cooling the air from 400° F. to 250° F.; whereas if steam is used, the heat of condensation will impart about 900 BTUs to the contiguous edges 77 and 78. This tremendous difference in BTUs means that the present machine is satisfactory to seal these edges in only about one second, whereas this would certainly not be the case if hot air were used. A machine constructed in accordance with the present invention is capable of sealing such multi-ply bags at the rate of 40 per minute, without damage to any intermediate cross laminated oriented ply and without damage to any exterior lacquer coating.

It will be noted that the steam chest 44, 45 is elongated and this is so that it may envelop the open part of the bag form. In the preferred embodiment the elongated dimension of the steam chest is parallel to the first path and the bag forms 12 are conveyed in a direction transverse to their own elongated dimension so that it is the open mouth of an end of the tubular bag form which is enveloped by the steam chest.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A bag ply sealer to seal together two contiguous edges of inner heat sealable ply means in a bag form, comprising in combination,
    an openable and closable steam chest positioned on a first path,
    valve means connected to supply steam to said chest,
    conveyor means to move a bag form along said first path to said steam chest,
    power means connected to open and to close said steam chest in a condition enveloping an open part of the bag form with two contiguous edges of the heat sealable ply means exposed to the interior of said steam chest,
    and control means connected to said power and valve means, to close said steam chest over the open part of a bag form and to stop the conveying of the bag form, to control said valve means to apply steam to said steam chest to enter the open part of a bag to heat the two contiguous edges of the heat sealable ply means, to close said valve means, and to open said steam chest and restart the conveying of the bag form by said conveyor means to move the bag form out of the opened steam chest.

2. A bag ply sealer as set forth in claim 1, including gasket means in said steam chest engageable with the bag form to establish an effective seal against passage of the steam out of said steam chest and to compress one side of the bag form against the other side.

3. A bag ply sealer as set forth in claim 1, wherein said openable steam chest includes first and second parts engageable with first and second sides of the bag form.

4. A bag ply sealer as set forth in claim 3, including gasket means in said steam chest engaging the two sides of the bag form to establish an effective seal against the passage of steam.

5. A bag ply sealer as set forth in claim 4, wherein said gasket means engage each other opposite the open part of the bag form.

6. A bag ply sealer as set forth in claim 1, including a horizontal support to support and guide the bag forms in said first path.

7. A bag ply sealer as set forth in claim 1, wherein said conveyor means includes a first continuously operating conveyor and a second intermittently operating conveyor.

8. A bag ply sealer as set forth in claim 7, including a motor and clutch and brake means connected in a drive train from said motor to said second conveyor,
and said control means includes switch means connected to be actuated in accordance with movement of said first conveyor and connected to actuate said clutch and brake means to stop and start said second conveyor.

9. A bag ply sealer as set forth in claim 7, wherein said second conveyor conveys bag forms to and from said steam chest.

10. A bag ply sealer as set forth in claim 7, wherein said second conveyor is a pair of belt conveyors engaging opposite sides of the bag form.

11. A bag ply sealer as set forth in claim 7, wherein said control means controls the stopping of said second conveyor with a bag form at said steam chest and controls the restarting of said second conveyor to convey the bag form away from said steam chest.

12. A bag ply sealer as set forth in claim 7, wherein said first conveyor has lugs to engage and move bag forms spaced from each other a distance sufficient to permit heat seal of a bag form in said steam chest and removal thereof prior to a succeeding bag form being conveyed to said steam chest.

13. A bag ply sealer as set forth in claim 1, wherein said control means includes switch means connected to control said conveyor, valve and power means.

14. A bag ply sealer as set forth in claim 1, wherein said control means includes switch means connected to control stopping and starting of said conveyor means, opening and closing of said steam chest and opening and closing of said valve means.

15. A bag ply sealer as set forth in claim 1, wherein said steam chest is elongated in the direction of said first path and the bag form is elongated in a direction transverse to said first path.

16. The process of sealing together two contiguous edges of inner heat sealable ply means in a bag form by use of conveyor means and a two part openable steam chest, comprising the steps of:

conveying a bag form on the conveyor means toward the steam chest,
closing said steam chest upon an intermediate part of a bag form to hold the bag form stationary and to envelop the open part of the bag form,
applying steam to said steam chest to cause it to enter the open part of the bag form to heat seal the exposed contiguous edges of the inner heat sealable ply means,
terminating the supply of steam to the steam chest,
and conveying the bag form beyond the steam chest.

17. The process as set forth in claim 16, wherein said closing step includes forming an effective seal with the bag form to contain the steam within the steam chest.

18. The process as set forth in claim 17, wherein said closing step includes closing a portion of the steam chest upon itself and closing another portion of the steam chest upon opposite sides of the bag form.

19. The process as set forth in claim 16, including opening the steam chest after application of steam thereto.

20. The process as set forth in claim 16, including use of first and second conveyors in said conveying means, with said first conveyor operating at a uniform rate and with said second conveyor operating intermittently.

21. The process as set forth in claim 20, wherein said first conveying step is by the first conveyor and then by the second conveyor.

22. The process as set forth in claim 21, wherein said second conveying step is by the second conveyor.

23. The process as set forth in claim 16, including conveying a plurality of successive bag forms with the downstream flowing bag forms becoming closer together as each approaches the steam chest.

24. The process as set forth in claim 23, including spacing successive bag forms apart sufficiently so that they do not abut each other before the downstream bag is conveyed beyond the steam chest.

25. The process as set forth in claim 16, including varying the timing of the conveying of the bag forms and the applying of steam at the steam chest to achieve satisfactory sealing at a maximum rate of conveying.

* * * * *